(12) United States Patent
Belzner

(10) Patent No.: US 11,562,842 B2
(45) Date of Patent: Jan. 24, 2023

(54) ELECTROMAGNETIC ACTUATING DEVICE AND METHOD FOR MANUFACTURING AN ELECTROMAGNETIC ACTUATING DEVICE

(71) Applicant: Robert Bosch GmbH, Stuttgart (DE)

(72) Inventor: Norbert Belzner, Lauffen (DE)

(73) Assignee: Robert Bosch GmbH, Stuttgart (DE)

( * ) Notice: Subject to any disclaimer, the term of this patent is extended or adjusted under 35 U.S.C. 154(b) by 49 days.

(21) Appl. No.: 17/034,916

(22) Filed: Sep. 28, 2020

(65) Prior Publication Data

US 2021/0172544 A1 Jun. 10, 2021

(30) Foreign Application Priority Data

Dec. 6, 2019 (DE) ............... DE 10 2019 219 059.6

(51) Int. Cl.
*F16K 31/06* (2006.01)
*H01F 7/08* (2006.01)
(Continued)

(52) U.S. Cl.
CPC .......... *H01F 7/081* (2013.01); *F16C 17/024* (2013.01); *F16C 33/121* (2013.01); *F16C 33/124* (2013.01); *F16C 33/125* (2013.01); *F16C 33/201* (2013.01); *F16K 31/06* (2013.01); *F16C 2208/32* (2013.01); *F16C 2361/91* (2013.01); *F16K 31/0675* (2013.01)

(58) Field of Classification Search
CPC ............... H01F 7/081; H01F 2007/085; H01F 2007/163; H01F 7/1607; H01F 7/129; H01F 7/13; H01F 7/1615; H01F 41/00; F16C 17/024; F16C 33/201; F16C 2208/32; F16C 2361/91; F16C 17/12; F16C 33/121; F16C 33/124; F16C 33/125; F16K 31/0675; F16K 31/06
USPC .......................... 251/129.01–129.22; 137/375
See application file for complete search history.

(56) References Cited

U.S. PATENT DOCUMENTS 4,510,966 A * 4/1985 Parsons, Jr. ............. F16K 5/166
277/362
4,535,803 A * 8/1985 Price ..................... F16K 5/0285
251/312
(Continued)

FOREIGN PATENT DOCUMENTS

DE 102006055796 A1 5/2008
DE 102012223430 A1 6/2014

*Primary Examiner* — John Bastianelli
(74) *Attorney, Agent, or Firm* — Norton Rose Fulbright US LLP; Gerard Messina

(57) ABSTRACT

An electromagnetic actuating device. The device includes an electromagnetic coil including a central recess extending in an axial direction, a cylindrical pole tube inserted into the central recess and provided with a magnetic separation point, an armature situated displaceably in the pole tube, the armature being movable by an actuation of the electromagnetic coil, the armature being mounted in the pole tube in a sleeve-shaped bearing foil inserted into the pole tube, the bearing foil including an inner side facing toward the armature and used as a sliding surface and an outer side facing toward the cylindrical pole tube. It is provided that the bearing foil is coated at least on the inner side using a first layer made of perfluoroalkoxy polymer. A manufacturing method for such an electromagnetic actuating device is also described.

9 Claims, 3 Drawing Sheets

(51) Int. Cl.
    *F16C 33/20*     (2006.01)
    *F16C 17/02*     (2006.01)
    *F16C 33/12*     (2006.01)

(56) References Cited

U.S. PATENT DOCUMENTS

| | | | | |
|---|---|---|---|---|
| 4,826,130 | A * | 5/1989 | Griffith | H01F 7/1607 |
| | | | | 251/368 |
| 5,526,837 | A * | 6/1996 | Eaker | F16K 31/0655 |
| | | | | 251/129.21 |
| 6,305,416 | B1 * | 10/2001 | Snel | F04B 49/022 |
| | | | | 251/368 |
| 6,637,456 | B2 * | 10/2003 | Sett | F16K 17/12 |
| | | | | 137/533.27 |
| 6,722,627 | B2 * | 4/2004 | Murao | F16K 31/0668 |
| | | | | 251/129.15 |
| 8,854,164 | B2 * | 10/2014 | Fleischer | H01F 7/1607 |
| | | | | 335/282 |
| 9,541,215 | B2 * | 1/2017 | Schudt | F16K 31/06 |
| 2007/0163655 | A1 * | 7/2007 | Hunter | F16K 3/0236 |
| | | | | 251/368 |
| 2013/0020522 | A1 * | 1/2013 | Hunter | F16K 3/36 |
| | | | | 251/368 |

* cited by examiner

ELECTROMAGNETIC ACTUATING DEVICE AND METHOD FOR MANUFACTURING AN ELECTROMAGNETIC ACTUATING DEVICE

CROSS REFERENCE

The present application claims the benefit under 35 U.S.C. § 119 of German Patent Application No. DE 102019219059.6 filed on Dec. 6, 2019, which is expressly incorporated herein by reference in its entirety.

BACKGROUND INFORMATION

Electromagnetic actuating devices are used, for example, in electromagnetically actuated hydraulic valves for transmission clutches of a motor vehicle. In order that these shifting processes run preferably smoothly so they are not noticed by the driver, it is desirable to set the hydraulic pressure at the clutches in accordance with predetermined pressure ramps with ultrahigh pressure precision. The pressure required for this purpose may be provided with the aid of hydraulic slide valves. These slide valves may be actuated either via a pilot valve including an electromagnet (pilot control) or directly via an electromagnetic actuating device.

An electromagnetic actuating device is described, for example, in German Patent Application No. DE 10 2012 223 430 A1 and includes, among other things, an electromagnetic coil having a central recess extending in the axial direction, a cylindrical pole tube provided with a magnetic separation point, an armature situated displaceably in the pole tube, and a force transmission element displaceably mounted in the axial direction on the electromagnetic actuating device. The armature is movable by actuation of the electromagnetic coil in such a way that a force exerted by the armature is transmittable to the force transmission element.

In the electromagnetic actuating devices used in hydraulic valves, an electromagnetic force proportional to the coil current results, using which the hydraulic valve is actuated. To achieve the required high pressure precision, the electromagnet is to have a very precise force-current characteristic curve with little variation of the force level. A variation of the magnetic force level and a hysteresis of the force-current characteristic curve caused by friction are to be limited to a minimum.

To achieve this, the armature is mounted in the pole tube in a sleeve-shaped bearing foil inserted into the pole tube, the bearing foil including an inner side facing toward the armature and used as a sliding surface and an outer side facing toward the cylindrical pole tube and the bearing foil being manufactured at least partially from a friction-reducing material. For example, German Patent Application No. DE 10 2006 055 796 A1 describes an electromagnetic actuating device including a bearing foil which is made up of a glass fiber fabric, which may be saturated using PTFE in multiple steps in soaking baths and may be coated on both sides with a PTFE dispersion and subsequently sintered. The use of a bearing foil including PTFE coating results in minor friction forces and thus in a reproducible magnetic force for a specific armature position. Due to the minor friction, a magnetic force-distance characteristic curve including very slightly pronounced hysteresis and very minor variations of the hysteresis results upon movement of the armature.

SUMMARY

The present invention relates to an electromagnetic actuating device. In accordance with an example embodiment of the present invention, the electromagnetic actuating device include an electromagnetic coil including a central recess extending in an axial direction, a cylindrical pole tube inserted into the central recess and provided with a magnetic separation point, an armature situated displaceably in the pole tube, the armature being movable by an actuation of the electromagnetic coil, the armature being mounted in the pole tube in a sleeve-shaped bearing foil inserted into the pole tube, the bearing foil including an inner side facing toward the armature and used as a sliding surface and an outer side facing toward the cylindrical pole tube. It is provided according to an example embodiment of the present invention that the bearing foil is coated at least on the inner side using a first layer made of a perfluoroalkoxy polymer.

Furthermore, the present invention relates to a method for manufacturing such an electromagnetic actuating device. In accordance with an example embodiment of the present invention, the method includes the following steps:

providing an electromagnetic coil including a central recess extending in an axial direction, inserting a cylindrical pole tube provided with a magnetic separation point into the central recess, manufacturing a sleeve-shaped bearing foil, the bearing foil being transferred from a flat starting shape into a sleeve shape including an outer side and an inner side used as a sliding surface, inserting the sleeve-shaped bearing foil into the pole tube, the outer side of the bearing foil facing toward the pole tube, and inserting an armature into the pole tube in such a way that the inner side of the bearing foil used as the sliding surface faces toward the armature.

It is provided according to the present invention that in the step of manufacturing, the bearing foil is coated using a first layer made of a perfluoroalkoxy polymer on a side provided as the inner side of the later sleeve shape before the transformation into the sleeve shape.

The magnetic force which an electromagnet is capable of exerting increases with the reduction of air gaps in the magnetic circuit, i.e., with the reduction of areas in the magnetic flux in which the magnetic flux is not conducted in the ferromagnetic material. The magnetic resistance is reduced with the reduction of the air gaps. A greater magnetic flux advantageously results from the reduction of existing air gaps in an electromagnetic actuating device of the type mentioned at the outset and thus also a higher axial magnetic force which the armature is capable of exerting on the actuating element. In order that the electromagnetic actuating device may exert a large force, it is therefore advantageous, on the one hand, to keep the total thickness of the bearing foil preferably small, in order to design a gap between the inner wall of the pole tube and the armature to be preferably small.

However, due to the eccentricity occurring in practice between the armature and the pole tube, in addition to an axial magnetic force, a radially acting magnetic force perpendicular thereto may also arise, which is absorbed by the bearing foil. The radially acting magnetic force is responsible for the occurrence of friction and a disadvantageous influence of the hysteresis of the magnetic force-distance characteristic curve. If the total thickness of the bearing foil is reduced, in addition to the axial magnetic force, the radial magnetic force also increases to the same extent, so that the bearing foil is more heavily loaded. There is the risk that the bearing foil will wear out in the event of an excessively high radial magnetic force.

Because the bearing foil is coated at least on the inner side using a first layer made of a perfluoroalkoxy polymer, the bearing foil is advantageously wear-proof even in the event of an advantageous reduction of the total thickness of the bearing foil, a high axial magnetic force of the electromagnetic actuating device being enabled at the same time.

Due to the coating using a perfluoroalkoxy polymer (abbreviated "PFA") on the sliding surface of the bearing foil on the inner side, the surface is modified there in such a way that a higher bearing load may advantageously be absorbed. Perfluoroalkoxy polymers are completely fluorinated plastics, in particular copolymers of tetrafluoroethylene and perfluoroalkoxy vinyl ethers, such as for example, perfluorovinyl propyl ether.

Perfluoroalkoxy polymers may advantageously be processed thermoplastically. In comparison to PTFE, perfluoroalkoxy polymers have better anti-adhesive properties and a higher chemical resistance. Perfluoroalkoxy polymers do in principle have a lower scratch resistance than, for example, PTFE, however, due to the easier processability, perfluoroalkoxy polymers permit surface irregularities at the sliding surface of the bearing foil to be compensated for, from which an enlarged contact surface and a lower surface pressure results between armature and bearing foil. The wear resistance is thus significantly improved.

Advantageous designs and refinements of the present invention are enabled by the features described herein.

For cost reduction, it is initially sufficient to apply the coating with a perfluoroalkoxy polymer (PFA layer) on only one side on the bearing foil, namely on the sliding surface facing toward the armature. The friction coefficient of PFA is slightly higher in comparison to PTFE, but the minor difference in the friction coefficient is of subordinate significance in the electromagnetic actuating devices described here. It is moreover also possible to additionally coat the sleeve-shaped bearing foil using a second layer made of a perfluoroalkoxy polymer on the outer side, to also increase the wear resistance there.

It may advantageously be provided that the sleeve-shaped bearing foil as the carrier material includes a glass fiber fabric saturated using PTFE, which is provided with a PTFE layer in each case on the inner side and outer side, a first layer made of a perfluoroalkoxy polymer being applied at least to the PTFE layer on the inner side. The coating using a perfluoroalkoxy polymer is capable of compensating for irregularities in the PTFE layer, so that the sliding surface of the bearing foil facing toward the armature becomes smoother.

The first layer and/or the second layer made of perfluoroalkoxy polymer may advantageously include a minor layer thickness of less than 5 μm, so that the total thickness of the bearing foil remains relatively small and the magnetic force may be increased. The total thickness of the bearing foil may advantageously be between 25 μm and 75 μm.

The bearing foil may be used in combination with a one-piece pole tube, whose magnetic separation point is formed, for example, by a groove in the pole tube, or also in combination with a multipart pole tube, in which the magnetic separation point is formed by a separation ring between two pole tube sections.

BRIEF DESCRIPTION OF THE DRAWINGS

One possible specific embodiment of the present invention is explained hereinafter with reference to the figures.

DETAILED DESCRIPTION OF EXAMPLE EMBODIMENTS

Figure 1:
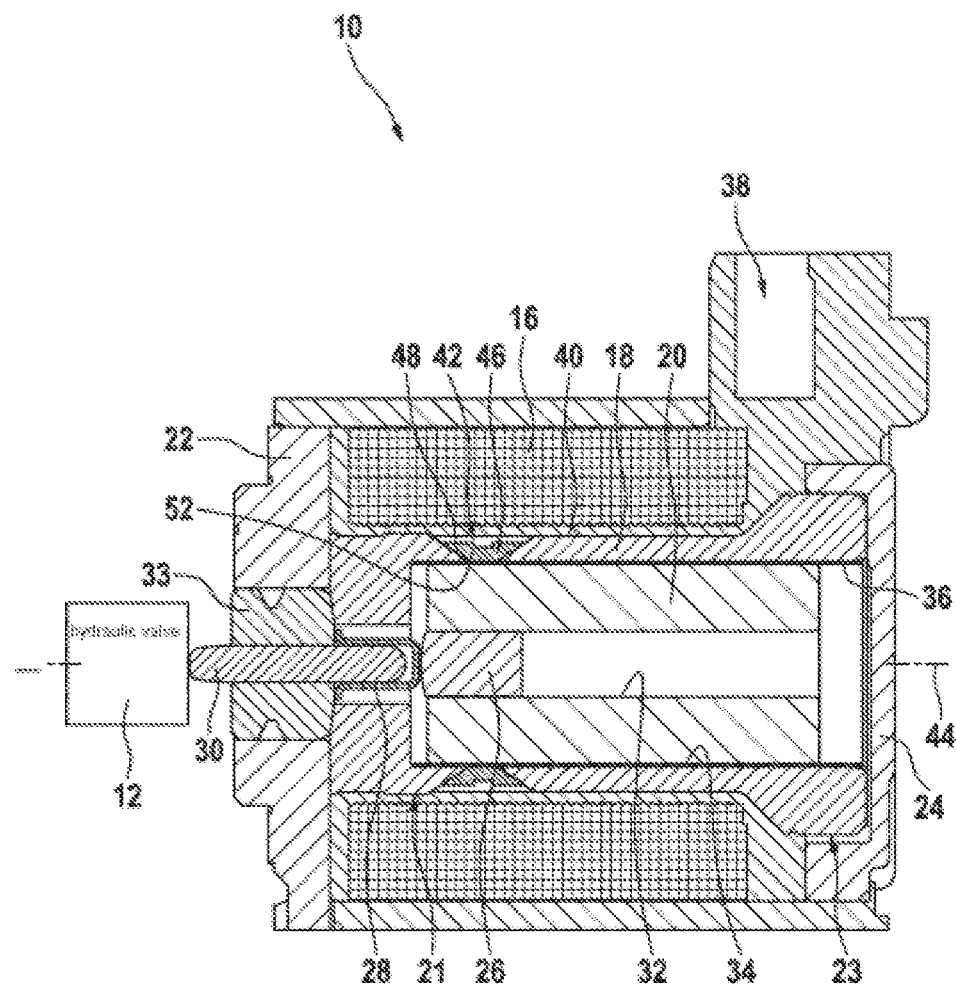
FIG. 1 shows a schematic cross section through an electromagnetic actuating device.

FIG. 1 shows an electromagnetic actuating device as reference numeral 10. Such an electromagnetic actuating device 10 is used, for example, in transmission technology in motor vehicles, in particular to control a clutch of an automatic transmission. For this purpose, for example, a hydraulic valve, which is only schematically indicated in FIG. 1 by a box provided with reference numeral 12, is actuated by electromagnetic actuating device 10.

Electromagnetic actuating device 10 includes a coil 16, which is situated around a cylindrical pole tube 18. Coil 16 is made up of a winding element, which includes by way of example in the present case a copper wire having a certain number of turns, through which an electric current flows upon energization. It is controlled or regulated by a control unit (not shown in the drawings). Coil 16 and the control unit are electrically connected to one another via an electrical contact element 38 with the aid of connecting lines (also not shown). Coil 16 includes a central internal recess 40, which extends along a center axis 44 in an axial direction and into which pole tube 18 is inserted. An armature 20 is slidingly mounted in cylindrical pole tube 18. An annular disk-shaped flow disk 22 is placed on pole tube 18 or connected thereto on a first axial end area 21 of pole tube 18 on the left in FIG. 1. A further flow disk 24 is fastened on pole tube 18 on a second axial end area 23 of the pole tube on the right in FIG. 1.

A grooved recess 42 extending in the circumferential direction, which is used as a magnetic separation point 46, is provided in the vicinity of first axial end area 21 on an outer side of pole tube 18 formed by an outer lateral surface. As shown in FIG. 1, recess 42 may have, for example, an approximately trapezoidal cross section and a ring area 52 filled with a nonmagnetic material, which is in contact with inclined edges 48 of recess 42. In this case, the pole tube is constructed in three parts, for example, and is made up of ring area 52, on each of the opposing sides of which a pole tube section adjoins. However, it is also possible to form pole tube 18 in one piece including a recess 42 which is only introduced into the outer lateral surface of the pole tube. The magnetic flux through pole tube 18 is influenced by recess 42. In principle, pole tube 18 unifies a magnetic core for radially feeding the magnetic flux into armature 20 with a pole core, which is used as the magnetic pole complementary to the armature. Recess 42 prevents a magnetic short-circuit. The magnetic iron cross section thus reduced in the recess or groove goes into saturation even at low coil currents and thus acts similarly to an air gap between a magnetic core and a pole piece.

As is furthermore apparent in FIG. 1, a blank 26 is pressed into a continuous axial recess 32 of the armature 20. A pot-shaped sleeve 28 presses against blank 26. A force transmission element 30 designed as a tappet is in turn pressed into sleeve 28. A guide ring 33 for force transmission element 30 is pressed into flow disk 22. It is used as a stop for pot-shaped sleeve 28. Force transmission element 30 in turn acts on hydraulic valve 12. However, armature 20 may alternatively also act directly on hydraulic valve 12 without a force transmission element.

As mentioned above, armature 20 is slidingly mounted in pole tube 18. To improve the mounting, a bearing foil 36 is attached between armature 20 and an inner side 34 of pole tube 18 formed by an inner lateral surface, as will be explained in detail below.

Electromagnetic actuating device 10 operates as follows: depending on the level of the electric current which flows through coil 16, an electromagnetic force is generated which acts on armature 20 and moves it from a starting position on the right in FIG. 1 into the left end position shown in FIG. 1. In this end position, the stroke of armature 20 is limited by the contact of pot-shaped sleeve 28 on guide ring 33. If the energization of coil 16 is ended, armature 20 is moved by a spring (not shown) tensioned, for example, between pole tube 18 and armature 20 and/or a hydraulic force acting via hydraulic valve 12 on force transmission element 30 back into the (right) starting position.

Figure 3:
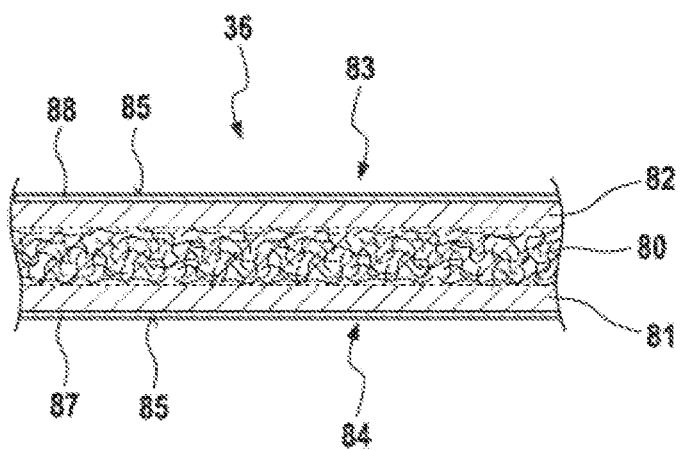
FIG. 3 shows a partial cross section through the bearing foil.

Bearing foil 36 may include, for example, a glass fiber fabric coated on both sides using PTFE (polytetrafluoroethylene). The starting shape of the foil may be formed to be flat. FIG. 3 shows an exemplary cross section through a bearing foil 36. A glass fiber fabric 80 is used as a carrier material. It is saturated using PTFE in a bath, a first PTFE layer 81 and a second PTFE layer 82 forming on both sides of the glass fiber fabric. The process may be repeated multiple times until bearing foil 36 is sintered. After the sintering, the surface of bearing foil 36 is coated on a side 84 of bearing foil 36 provided as inner side 66 of later sleeve shape 64 using a first layer 87 made of a perfluoroalkoxy polymer. First layer 87 made of perfluoroalkoxy polymer is applied, for example, directly to first PTFE layer 81. The layer thickness of first layer 87 is preferably less than 5 µm. Optionally, bearing foil 36, as shown in FIG. 3, may be coated on opposing side 83 using a second layer 88 made of perfluoroalkoxy polymer, which is applied to second PTFE layer 82.

The manufacturing of the bearing foil from a carrier material which includes a glass fiber fabric coated using PTFE is to be considered an advantageous embodiment variant of the present invention. However, it is also possible to use a different carrier material which is coated on the inner side of the later sleeve shape using a first layer made of perfluoroalkoxy polymer.

Figure 2:
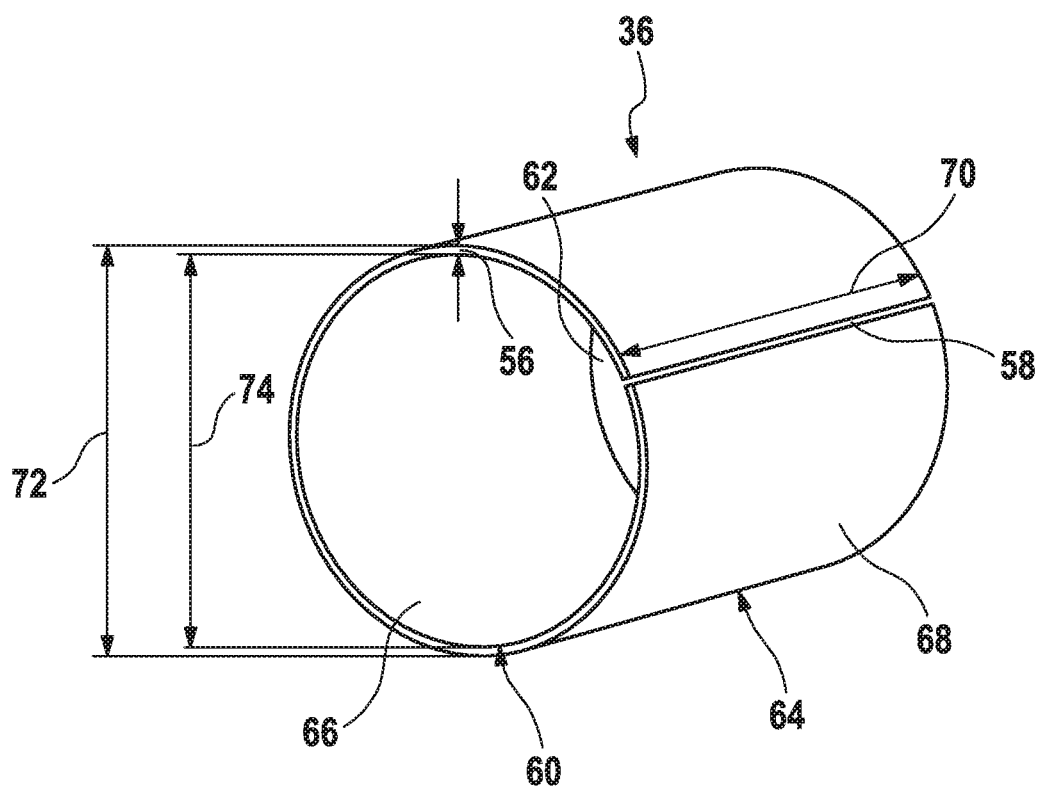
FIG. 2 shows a perspective view of the bearing foil.

Finally, bearing foil 36, possibly after trimming, is rolled into sleeve shape 64 shown in FIG. 2 having an external diameter 72 and an internal diameter 74 and an axial length 70. Total thickness 56 of bearing foil 36, i.e., half of the difference between external diameter 72 and internal diameter 74, may preferably be between 25 µm and 75 µm. The ends of bearing foil 36 facing toward one another form a joint 58. Sleeve shape 64 has a first open end face 60, a second open end face 62, and an inner side 66 and an outer side 68. First layer 87 made of perfluoroalkoxy polymer is located after the manufacturing of sleeve shape 64 on inner side 66 of sleeve-shaped bearing foil 36. Optionally provided second layer 88 made of perfluoroalkoxy polymer is located on outer side 68 of bearing foil 36.

Finally, sleeve-shaped bearing foil 36 is inserted into pole tube 18. Axial length 70 of bearing foil 36 may be shorter than the axial length of the inner recess of pole tube 18. After the insertion of bearing foil 36, outer side 68 of bearing foil 36 faces toward pole tube 18 or inner side 34 of the pole tube and presses against it. Bearing foil 36 in sleeve shape may have a certain tension after the insertion, which presses outer side 68 against inner side 34 of the pole tube.

Finally, armature 20 may be inserted into the pole tube, inner side 66 of bearing foil 36 used as sliding surface 85 facing toward armature 20.

What is claimed is:

1. A method for manufacturing an electromagnetic actuating device, the method comprising the following steps:
   providing an electromagnetic coil including a central recess extending in an axial direction;
   inserting a cylindrical pole tube provided with a magnetic separation point into the central recess;
   manufacturing a sleeve-shaped bearing foil, the bearing foil being transferred from a flat starting shape into a sleeve shape with an outer side and an inner side used as a sliding surface;
   inserting the sleeve-shaped bearing foil into the pole tube, the bearing foil facing toward the pole tube with the outer side; and
   inserting an armature into the pole tube in such a way that the inner side of the bearing foil used as the sliding surface faces toward the armature;
   wherein in the step of manufacturing, before the transformation into the sleeve shape, the bearing foil is coated on a side provided as the inner side of the later sleeve shape using a first layer made of a perfluoroalkoxy polymer,
   wherein the sleeve-shaped bearing foil includes a glass fiber fabric saturated using PTFE as a carrier material, which is provided on the inner side and the outer side with a PTFE layer in each case, the first layer made of a perfluoroalkoxy polymer being applied at least to the PTFE layer on the inner side,
   wherein the first layer made of perfluoroalkoxy polymer has a layer thickness of less than 5 µm.

2. The method as recited in claim 1, wherein the bearing foil is additionally coated on a side provided as the outer side of the later sleeve shape using a second layer made of a perfluoroalkoxy polymer.

3. The method as recited in claim 1, wherein the PTFE layer is coated on a side provided as the outer side of the later sleeve shape using a second layer made of a perfluoroalkoxy polymer.

4. An electromagnetic actuating device, comprising:
   an electromagnetic coil including a central recess extending in an axial direction;
   a cylindrical pole tube inserted into the central recess and provided with a magnetic separation point; and
   an armature situated displaceably in the pole tube, the armature being movable by an actuation of the electromagnetic coil, the armature being mounted in the pole tube in a sleeve-shaped bearing foil inserted into the pole tube, the bearing foil including an inner side facing toward the armature and used as a sliding surface, and an outer side facing toward the cylindrical pole tube, wherein the bearing foil is coated at least on the inner side using a first layer made of perfluoroalkoxy polymer,
   wherein the sleeve-shaped bearing foil includes a glass fiber fabric saturated using PTFE as a carrier material, which is provided on the inner side and the outer side with a PTFE layer in each case, the first layer made of a perfluoroalkoxy polymer being applied at least to the PTFE layer on the inner side,
   wherein the first layer made of perfluoroalkoxy polymer has a layer thickness of less than 5 µm.

5. The electromagnetic actuating device as recited in claim 4,
   wherein the sleeve-shaped bearing foil is additionally coated on the outer side using a second layer made of a perfluoroalkoxy polymer.

6. The electromagnetic actuating device as recited in claim 5,
   wherein the second layer made of perfluoroalkoxy polymer has a layer thickness of less than 5 μm.

7. The electromagnetic actuating device as recited in claim 4,
   wherein the pole tube is formed in one piece or multiple parts.

8. The electromagnetic actuating device as recited in claim 4,
   wherein a total thickness of the bearing foil is between 25 μm and 75 μm.

9. The electromagnetic actuating device as recited claim 4,
   wherein the electromagnetic actuating device includes a force transmission element displaceable in the axial direction, a force exerted by the armature being transmittable to the force transmission element.

* * * * *